United States Patent
Georgeaux et al.

(10) Patent No.: US 10,433,303 B2
(45) Date of Patent: Oct. 1, 2019

(54) METHOD AND SYSTEM FOR DETERMINING AN INTERVAL OF FREQUENCIES IN A TELECOMMUNICATIONS NETWORK

(71) Applicant: AIRBUS DS SAS, Elancourt (FR)

(72) Inventors: Eric Georgeaux, Montigny le Bretonneux (FR); Christophe Gruet, Montigny le Bretonneux (FR); Frédéric Fraysse, Villeneuve-Tolosane (FR); Christophe Leraut, Montigny le Bretonneux (FR)

(73) Assignee: AIRBUS DS SAS, Elancourt (FR)

( * ) Notice: Subject to any disclaimer, the term of this patent is extended or adjusted under 35 U.S.C. 154(b) by 535 days.

(21) Appl. No.: 14/648,599

(22) PCT Filed: Nov. 19, 2013

(86) PCT No.: PCT/EP2013/003491
§ 371 (c)(1),
(2) Date: Oct. 5, 2015

(87) PCT Pub. No.: WO2014/082718
PCT Pub. Date: Jun. 5, 2014

(65) Prior Publication Data
US 2016/0037522 A1    Feb. 4, 2016

(30) Foreign Application Priority Data

Nov. 29, 2012  (FR) ...................................... 12 61420

(51) Int. Cl.
*H04W 72/02*    (2009.01)
*H04W 72/04*    (2009.01)
(Continued)

(52) U.S. Cl.
CPC ..... *H04W 72/0453* (2013.01); *H04W 52/146* (2013.01); *H04W 52/243* (2013.01);
(Continued)

(58) Field of Classification Search
None
See application file for complete search history.

(56) References Cited

U.S. PATENT DOCUMENTS 4,267,592 A * 5/1981 Craiglow ................. H04K 3/25
                                                        370/280
8,055,294 B2   11/2011 Lee et al.
(Continued)

FOREIGN PATENT DOCUMENTS

WO    WO 2010/082888 A1    7/2010
WO    WO 2010/112066 A1    10/2010

OTHER PUBLICATIONS

WO 2010/082888 A1 (Ericsson Telefon AB L M [SE]; Liu Yin [CN]; Kazmi Muhammad [SE]; Rong) Jul. 22, 2010 (Jul. 22, 2010)a.*
(Continued)

*Primary Examiner* — Michael J Moore, Jr.
*Assistant Examiner* — Prenell P Jones
(74) *Attorney, Agent, or Firm* — Pillsbury Winthrop Shaw Pittman LLP

(57) ABSTRACT

A method allows determination of a frequency interval for the emission, by an item of user equipment, of a signal to be sent to a base station in a telecommunications network, the frequency interval being within a predetermined frequency band over which the base station works, the method including the determination of frequency interval, wherein the determination of the frequency interval is achieved from a table of references including maximum power reduction values for the emission of a signal by the item of user (Continued)

equipment so that the power of the signal emitted by the item of user equipment at a predetermined out-of-band frequency is less than a predetermined maximum power limit value.

7 Claims, 5 Drawing Sheets

(51) Int. Cl.
    *H04W 52/14*     (2009.01)
    *H04W 52/24*     (2009.01)
    *H04W 52/36*     (2009.01)
    *H04W 72/08*     (2009.01)

(52) U.S. Cl.
    CPC ......... *H04W 52/367* (2013.01); *H04W 72/02* (2013.01); *H04W 72/082* (2013.01)

(56) References Cited

U.S. PATENT DOCUMENTS

| | | | | |
|---|---|---|---|---|
| 8,892,268 | B2* | 11/2014 | Huomo | H02J 3/06 700/296 |
| 2002/0115436 | A1* | 8/2002 | Howell | B60R 25/102 455/426.1 |
| 2006/0121944 | A1* | 6/2006 | Buscaglia | H04B 1/126 455/561 |
| 2007/0133993 | A1* | 6/2007 | Yee | H04B 10/50 398/85 |
| 2010/0323642 | A1* | 12/2010 | Morita | H04W 52/16 455/115.3 |
| 2012/0087323 | A1* | 4/2012 | Feng | H04L 5/0005 370/329 |
| 2012/0263156 | A1* | 10/2012 | Abraham | H04L 5/0023 370/338 |

OTHER PUBLICATIONS

WO 2010/112066 A1 (Nokia Siemens Networks OY [FI]; Roessel Sabine [DE]; Pesola Mikko [FI]) Oct. 7, 2010 (Oct. 7, 2010).*
International Search Report as issued in International Patent Application No. PCT/EP2013/003491, dated Feb. 10, 2014.

* cited by examiner

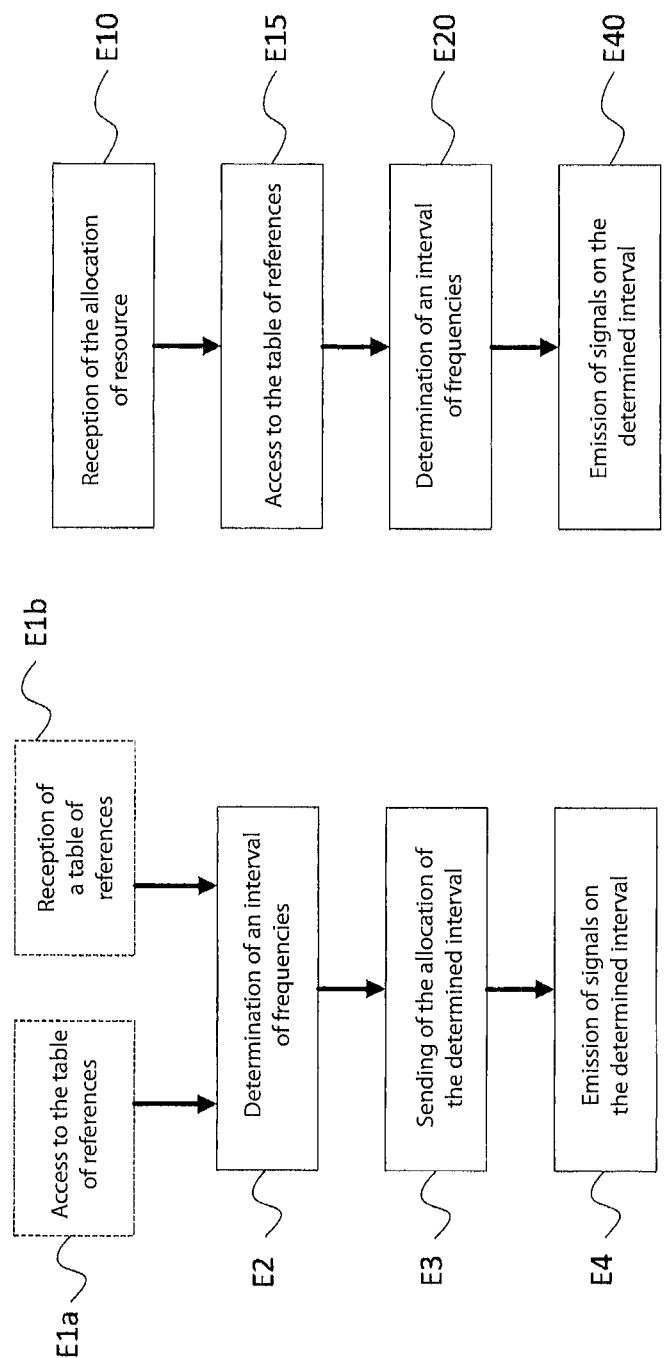

METHOD AND SYSTEM FOR DETERMINING AN INTERVAL OF FREQUENCIES IN A TELECOMMUNICATIONS NETWORK

CROSS-REFERENCE TO RELATED APPLICATIONS

This is the U.S. National Stage of PCT/EP2013/003491, filed Nov. 19, 2013, which in turn claims priority to French Patent Application No. 1261420, filed Nov. 29, 2012, the entire contents of all applications are incorporated herein by reference in their entireties.

FIELD OF THE INVENTION

The invention relates to the field of telecommunications networks, particularly wide-band, and pertains more particularly to a method and to a system for determining an interval of frequencies of transmission of a signal by a user equipment destined for a base station in a telecommunications network.

PRIOR ART

In telecommunications networks, for example wide-band networks of the Long-Term Evolution (LTE) type, a base station allocates in a known manner resources to a user equipment such that it can transmit signals comprising data packets destined for said base station. On the one hand, the base station determines one or more time intervals during which a given user equipment will be able to transmit signals. On the other hand, the base station determines, in a predetermined frequency band on which it works, at least one interval of frequencies of transmission on which said user equipment will be able to transmit said signals during said time intervals.

The base station also determines the type of modulation and the type of encoding of the signals which the user equipment could use for transmitting signals on said allocated time and frequency intervals. The allocation of resources and the choices of modulation and encoding may be carried out, for example, as a function of the power of the signal received from the user equipment by the base station and/or as a function of other user equipments which transmit signals also destined for the base station.

This information of allocation of resources is then communicated to the user equipment which can then transmit, to the base station, signals by adjusting its power of transmission to a level less than or equal to its maximum power on the allocated intervals while using the type of modulation and the type of encoding determined beforehand by the base station.

It nevertheless happens that the signals transmitted by the user equipment on the allocated interval of frequencies of transmission are also transmitted, at lower power, at frequencies close to that of the allocated interval of frequencies, the level of these transmissions outside of the allocated interval of frequencies being in general higher the closer the power of transmission of the user equipment is to its maximum power of transmission.

A problem is then posed when the signals are transmitted off-band by the user equipment, that is to say at frequencies situated outside of the predetermined working frequency band of the base station, and that their power is greater than a predetermined maximum limit value. Such a limit, fixed for example at −57 dBm measured in a band of 6.25 kHz in the interval 769-775 MHz in the norm 3GPP TS36.101, makes it possible to avoid the signals transmitted by the user equipment in a predetermined frequency band (the interval 777-787 MHz for the limit cited previously as an example) creating interferences with signals transmitted on neighbouring frequency bands which may be reserved for other uses.

This problem is posed in telecommunications networks in which the duplex spacing (i.e. the frequency separation between the transmission signal and the reception signal) is small. The signals transmitted off-band by the transmitter of the user equipment can disrupt the reception of signals from the base station, leading to a desensitization of the receiver. The problem is particularly bothersome in the case where the attenuation of the signal linked to the propagation between the user equipment and the base station is high: in these conditions, the user equipment has to transmit at a power close or equal to its maximum power which in general increases the level of off-band transmissions and thus the risk of desensitization of the receiver whereas the signals transmitted by the base station are received at a low level by the user equipment.

In order to respect this maximum limit value of power, an existing solution described in the U.S. Pat. No. 8,055,294 consists in authorising the user equipment to reduce its maximum power of transmission by a value, called MPR (Maximum Power Reduction), which the user equipment selects in a table of references stored in its internal memory. More precisely, the user equipment selects, firstly, in the table of references a maximum power reduction value as a function of an index of start of interval of frequencies and of a width of said interval of frequencies received from the base station. Then, secondly, the user equipment reduces its power of transmission of the number of decibels corresponding to the value selected in the table. However, a problem is posed for the base station during the allocation of resources and the type of encoding and modulation scheme because it does not know the maximum power reduction value used by the user equipment.

Thus, in order to allocate the type of encoding and modulating scheme as well as the time and frequency intervals to a user equipment, a first existing solution consists, for the base station, in considering that the equipment has reduced its power of transmission, for example by a predetermined value. However, in such a case, when the user equipment has not reduced its power of transmission, the encoding and modulation scheme as well as the time and frequency intervals allocated by the base station are not necessarily suited to the needs of the user equipment which cannot transmit as many data packets that it could really, which is a drawback.

A second solution consists, for the base station, in considering that the user equipment does not reduce its power of transmission by a MPR value. Nevertheless, in such a case, when the user equipment has really reduced its power of transmission by a MPR value, the encoding and modulation scheme as well as the time and frequency intervals allocated by the base station are not suited to its actual needs and the data packets transmitted by the user equipment are received by the base station with a high probability of de-encoding error, which is also a drawback.

Moreover, the reduction by the user equipment of its power of transmission may be very considerable in order to respect the required off-band maximum limit value of power. Thus, for example, a reduction of the power of transmission of 6 dB corresponds to a division of the power of transmission by 4, which will prevent the user equipment from transmitting large amounts of data and/or obliging it to have to re-transmit certain of the data frames which will have been transmitted at low power and received in error by the base station, which is another drawback.

DESCRIPTION OF THE INVENTION

The invention aims to eliminate at least in part these drawbacks and to improve existing telecommunication systems and particularly to enable the transmission of signals at a high power by a user equipment in an allocated interval of frequencies while assuring that the power of the signals transmitted at a predefined off-band frequency of transmission is less than a predetermined limit value of power.

Thus, the invention relates to a method for determining an interval of frequencies of transmission, by a user equipment, of a signal destined for a base station in a telecommunication network, said interval of frequencies lying in a predetermined frequency band on which the base station works, said method comprising a step of determining said interval of frequencies, the method being remarkable in that said step of determining the interval of frequencies is carried out on the basis of a table of references comprising values of reduction of maximum power of transmission of a signal by the user equipment so that the power of the signal transmitted by the user equipment at a predefined off-band frequency is less than a predetermined maximum limit value of power.

The interval of frequencies on which the user equipment transmits is thus determined from the table of references to assure that the power of the signals transmitted off-band by the user equipment is less than the predetermined limit value.

The term "off-band frequency" is taken to mean a frequency situated outside of the predetermined frequency band on which the base station works. The term "works" is taken to mean that the base station allocates intervals of frequencies in the predetermined frequency band and that, consequently, it is configured to receive signals transmitted by the user equipment on this predetermined frequency band. Finally, the term "transmission of a signal by a user equipment" is obviously taken to mean the transmission of one or more signals by the equipment destined for the base station.

Preferably, the table of references indicates a value of reduction of power of transmission of a signal as a function, on the one hand, of a value of start of an interval of frequencies and, on the other hand, of a value of width of said interval of frequencies from said start of interval value.

The table of references may be constructed empirically such that it comprises uniquely combinations of start of interval of frequencies and width of interval of frequencies for which the power of transmission of the user equipment at the predefined off-band frequency is less than the predetermined maximum limit value of power. The table of references may be, for example, the table of references of the specification 3GPP TS36.101.

Also preferably, the start of the interval of frequencies and the width of the interval of frequencies are selected so that the power of transmission of the signal by the user equipment is maximum.

According to an aspect of the invention, the start of the interval of frequencies and the width of the interval of frequencies are selected in the table of references such that the amount of information transferred is maximal. In this case, the choice of the start of the interval of frequencies and of its width may lead to reducing the power of transmission by a power reduction MPR value. A selection criterion may consist in searching for in the table of references the pair(s) of values of start of interval of frequencies RBStart and of width of interval of frequencies L_CRB for which the value $10 \cdot \log_{10}(L\_CRB) - MPR(RbStart, L\_CRB)$ takes its maximum value.

According to an aspect of the invention, the telecommunications networks comprises at least one base station configured to allocate, to the user equipment, at least one interval of frequencies comprised in the predetermined frequency band and to receive signals transmitted by the user equipment in the allocated interval.

In an embodiment of the method according to the invention, the step of determining the interval of frequencies is carried out by the base station. In this case, the interval of frequencies allocated by the base station corresponds to the determined interval of frequencies. In other words, the base station determines the interval of frequencies to allocate to the user equipment from the table of references. The base station can also use, in addition to the table of references, for example, an information of the value of the power of transmission of the user equipment. This information may be, for example, the measurement, sent by the user equipment to the base station, indicating the difference (in dB) between the actual power of transmission and the maximum power of transmission, potentially reduced, of the user equipment called Power Headroom (PH) reporting.

Advantageously, the table of references is stored in a database accessible by the base station and the method comprises, prior to the step of determination, a step of accessing said database to consult or to obtain the table of references.

According to an aspect of the invention, the method comprises, prior to the step of determination, a step of reception of the table of references, for example sent by the user equipment.

In an alternative embodiment of the method according to the invention, the step of determining the interval of frequencies is carried out by the user equipment. Since the table of references is specific to each user terminal, it is thus not necessary, for the terminal, to send it to the base station or instead, for the base station, to permanently store it.

In this embodiment, the base station allocates in a known manner an interval of frequencies on which the user equipment can transmit and the user equipment determines, from its table of references, an interval of frequencies for which the power of transmission of off-band signals is less than the predetermined limit value, said interval of frequencies to use lying within the allocated interval of frequencies. The term "lying within" is taken to mean that the determined interval of frequencies is a sub-interval of the allocated interval of frequencies or instead corresponds to the allocated interval of frequencies itself.

Advantageously, the user equipment comprises a memory in which the table of references is stored.

According to an aspect of the invention, the determined interval of frequencies is constituted of one or more consecutive frequency blocks and the step of determination comprises a step of selecting, in the table of references, a first frequency block and a number of frequency blocks consecutive to said first block thereby forming the frequency interval.

The invention also relates to a telecommunications system for determining an interval of frequencies of transmission, by a user equipment, of a signal destined for a base station in a telecommunication network, preferably wide-band, said system comprising at least one base station configured to work on a predetermined frequency band and at least one user equipment configured to transmit signals on said predetermined frequency band, said system being remarkable in that it comprises means for determining the interval of frequencies from a table of references comprising values of reduction of maximum power of transmission of a signal by the user equipment so that the power of the signal transmitted by the user equipment at a predefined off-band frequency is less than a predetermined maximum limit value of power.

The invention also relates to a base station for determining an interval of frequencies of transmission, by a user equipment, of a signal destined for said base station in a telecommunication network, said interval of frequencies lying in a predetermined frequency band on which the base station works, the base station being remarkable in that it comprises means of determining the interval of frequencies from a table of references comprising values of reduction of maximum power of transmission of a signal by the user equipment so that the power of the signal transmitted by the user equipment at a predefined off-band frequency is less than a predetermined maximum limit value of power.

The invention also relates to a user equipment for determining an interval of frequencies of transmission, by said user equipment, of a signal destined for a base station in a telecommunications network, said interval of frequencies lying in a predetermined frequency band on which said base station works and on which the user equipment is configured to transmit signals, the user equipment being remarkable in that it comprises means of determining the interval of frequencies from a table of references comprising values of reduction of maximum power of transmission of a signal by the user equipment so that the power of the signal transmitted by the user equipment at a predetermined off-band frequency is less than a predetermined maximum limit value of power.

The invention also relates to a computer programme support for the implementation, by a base station or by a user equipment, of the steps of the method as defined above.

Other characteristics and advantages of the invention will become clearer from the description given hereafter with regard to the appended figures given as non-limiting examples and in which identical references are given to similar objects:

FIG. 4 illustrates the method implemented by a base station in a first embodiment of the invention;

FIG. 5 illustrates the method implemented by a user equipment in a second embodiment of the invention;

DETAILED DESCRIPTION

The invention has been realised within the scope of a wide band network of the Long Term Evolution (LTE) type but it goes without saying that it can find application in any other telecommunications network.

Description of the System According to the Invention

Figure 1:
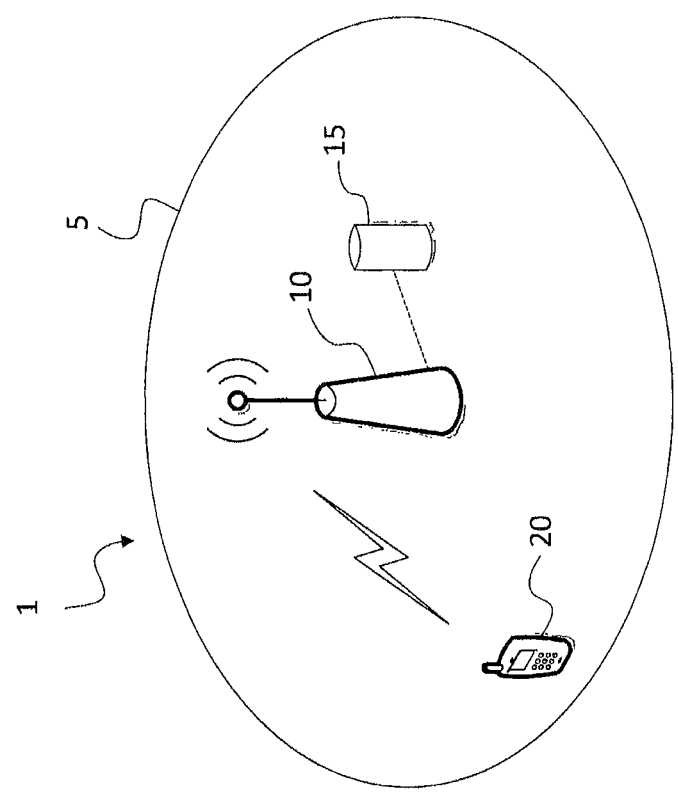
FIG. 1 illustrates the telecommunications system according to the invention.

As illustrated by FIG. 1, the system 1 according to the invention comprises a telecommunications network 5, a base station 10 and a user equipment 20. A single base station and a single user equipment have been represented in the interests of simplification but it goes without saying that such a system may comprise several base stations, each of them being able to communicate with one or more user equipments.

Figure 8:
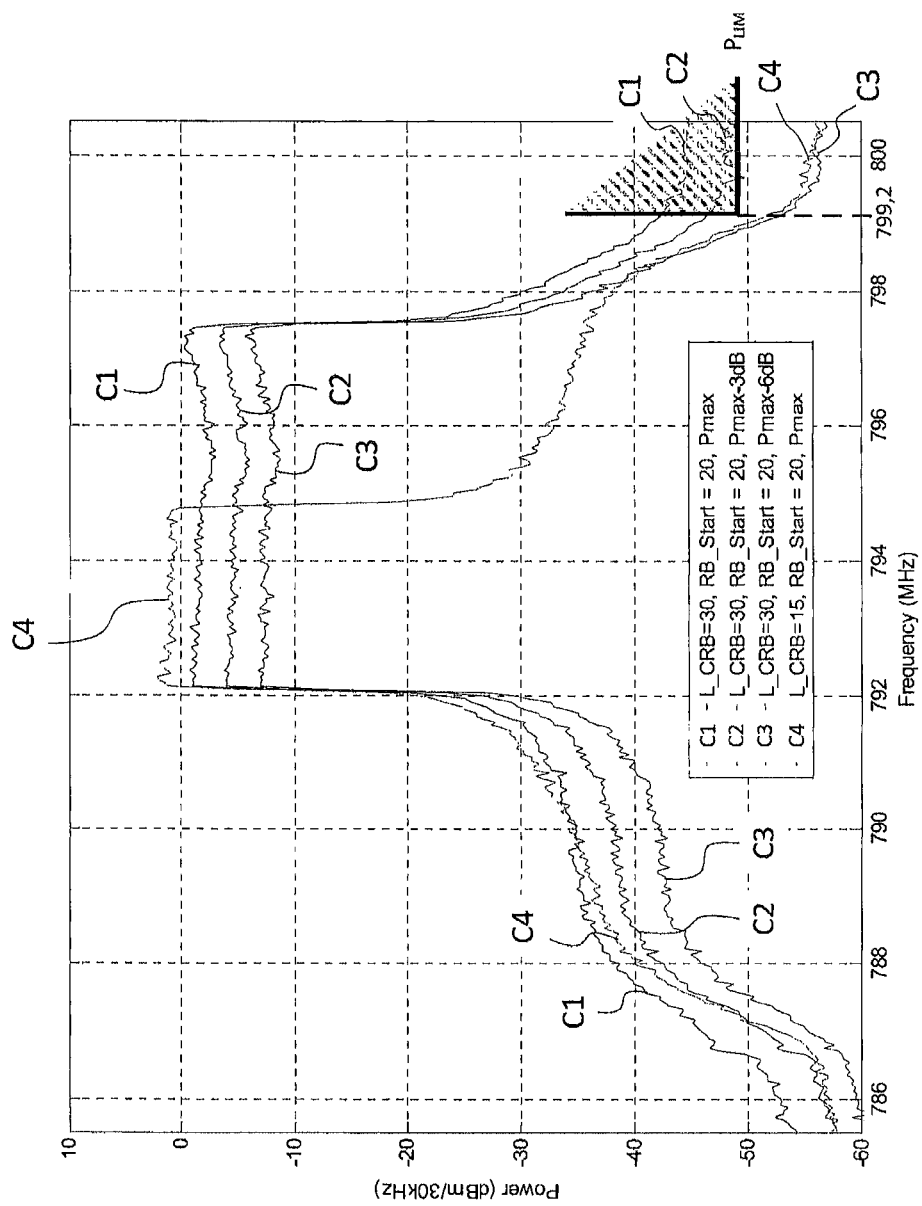
FIG. 8 represents power curves of transmission of signals, by a user equipment, according to the prior art and according to the invention.

The telecommunications network 5 allows the user equipment 20 to transmit signals in a known manner while using resources allocated by the base station 10. In this example, as illustrated in FIG. 8, the base station 10 works on a predetermined frequency band in reception lying between 788 MHz and 798 MHz called band 14 in the norm 3GPP TS36.101 (Table 5.5-1). The allocated resources are of time and frequency type and are defined in consecutive frames of 10 ms extending over the predetermined frequency bands. Each frame is divided into time and frequency blocks. In the norm 3GPP TS36.211, a frame is divided into 10 sub-frames of 1 ms and each sub-frame is subdivided into 14 time blocks of equal duration comprising the data to transmit (for example, Orthogonal Frequency Division Multiplexing (OFDM) symbols) and 50 frequency blocks of 180 kHz each in the case of a LTE 10 MHz telecommunications network configured with a cyclic prefix of standard duration (named "normal CP" in the specification 3GPP TS36.211).

During an allocation of resources for a user equipment 20, the base station 10 thus determines in each frame one or more time blocks defining an allocated time interval and one or more frequency blocks defining an allocated interval of frequencies on which the user equipment 20 is authorised to transmit signals destined for the base station 10 for the duration of the allocated time interval. The allocation of resources by the base station may be different for each frame or instead be defined for a determined number of consecutive frames.

When it allocates frequency blocks, that is to say a frequency interval, to a user equipment 20, the base station 10 determines a start value RBstart (Resource Block start) indicating the number of the first frequency block of the allocated interval of frequencies as well as the number of frequency blocks L_CRB constituting the allocated interval of frequencies.

The base station 10 also determines the type of modulation and the type of encoding of the signals that the user equipment 20 could use for transmitting signals on the allocated time and frequency intervals.

Once determined, the base station 10 sends the information of allocation of resources RBstart and L_CRB, as well as the type of modulation and the type of encoding determined so that the user equipment 20 can then transmit on the allocated interval, for the duration of the following frame, signals modulated and encoded according to the determined modulation and encoding. The base station may further indicate the number of frames for which the allocations of resources and modulation and encoding are made. Obviously, the base station can also allocate a number of time blocks in one frame or several frames such that the user equipment transmits during said blocks. For example, the base station 10 may allocate to the user equipment 20 a start of intervals of frequencies RBStart=0 and a width of intervals of frequencies L_CRB=4 for all the sub-frames (numbered from 0 to 9) of rank 3 and the frames of even rank. It will transmit with the previous example 1 ms every toms.

The base station 10 can then measure in a known manner the power of the signals received from the user equipment 20 in order to adapt the type of modulation and/or encoding and/or to modify the time and frequency intervals to allocate later to the user equipment.

Figure 2:
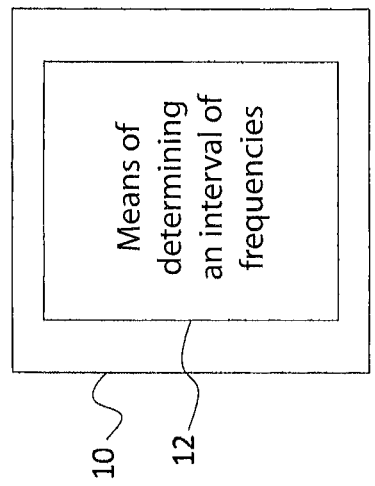
FIG. 2 illustrates a base station according to an embodiment form of the invention.

FIG. 2 illustrates a base station 10 according to an embodiment form of the system of the invention. The base station 10 may be connected to a database 15 of the system 1 (illustrated in FIG. 1). For example, such a database 15 may be comprised in the base station 10 or instead be external. The database 15 is capable of storing at least one table of references comprising values of reduction of maximum power of transmission of a signal of a user equipment 20.

In this embodiment form, the base station 10 comprises means of determining 12 the interval of frequencies, to allocate to the user equipment 20, from a table of references comprising maximum power reduction MPR values of transmission of a signal of the user equipment so that the power of the signal transmitted by the user equipment at a predefined off-band frequency is less than a predetermined maximum limit value of power. The term "MPR" is taken to mean a Maximum Power Reduction (MPR) value, an Additional Maximum Power Reduction (A-MPR) value or instead a Power Management Maximum Power Reduction (P-MPR) value.

Figure 3:
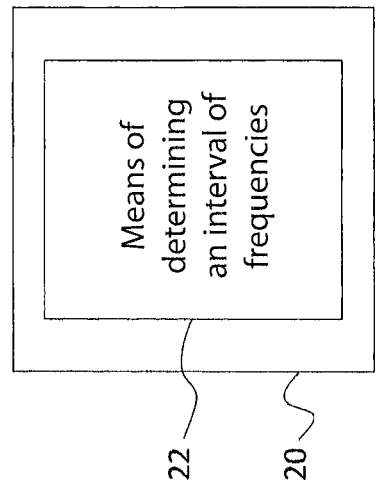
FIG. 3 illustrates a user equipment according to an embodiment form of the invention.

FIG. 3 illustrates a user equipment 20 according to another embodiment form of the system according to the invention. The user equipment 20 is capable of storing and/or receiving at least one table of references comprising maximum power reduction MPR values of transmission of a signal by the user equipment 20. The user equipment 20 comprises means of determining 22 the interval of frequencies, to use to transmit signals, from a table of references comprising maximum power reduction MPR values of transmission of a signal by the user equipment 20 so that the power of the signal transmitted by the user equipment at a predetermined off-band frequency is less than a predetermined maximum limit value of power.

Implementation of the Invention

FIGS. 4 and 5 describe two embodiments of the method according to the invention. The method according to the invention allows the determination of an interval of frequencies of transmission of signals by the user equipment 20 destined for the base station 10 in the telecommunication network 5.

The step of determining (E2, E20) the interval of frequencies is carried out on the basis of a table of references comprising maximum power reduction values of transmission of a signal by the user equipment so that the power of the signal transmitted by the user equipment at a predetermined off-band frequency is less than a predetermined maximum limit value of power.

Figure 6:
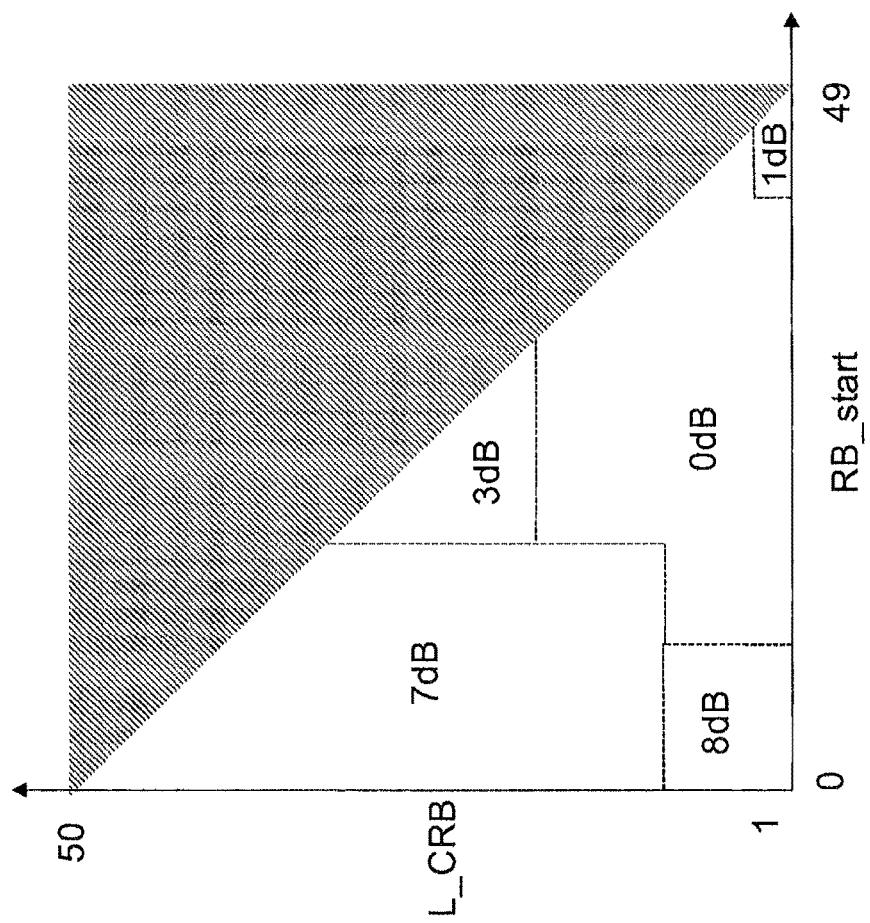
FIG. 6 illustrates an example of table of references comprising values of reduction of maximum power of transmission as a function of the start and of the width of an interval of frequencies.

In this example, the table of references makes it possible to determine a value of attenuation of power of transmission of the signal by the user equipment 20 as a function, on the one hand, of a value of start of frequency block RBstart and, on the other hand, of a number of frequency blocks L_CRB. A table of references is associated with a type of user equipment and may be constructed, for example, empirically in order to assure that the power of transmission delivered by the user equipment is less than a predefined limit value at a predetermined off-band frequency for each pair of values (RBstart; L_CRB) of the table. FIG. 6 illustrates an example of table of references, corresponding to a type of user equipment, in which each pair (RBstart, L_CRB) of values of start of intervals and width of intervals corresponds to a maximum power reduction MPR value to apply to guarantee that the off-band power of transmission of the user equipment is less than the predefined limit. For example, for RBstart=0 and L_CRB=25 then MPR=7 dB.

FIG. 4 describes a first embodiment of the method according to the invention in which the step of determination E2 is carried out by the base station 10. The base station 10 accesses, in a step E1a, a table of references stored in the database 15 and comprising maximum power reduction values of transmission of a signal of the user equipment. In such a case, it is not necessary for the user equipment to store the table of references. The database 15 may store the different types of tables of references associated with the different types of user equipments 20 capable of requiring an allocation of resources to transmit signals destined for the base station 10.

In a variant, the base station 10 receives the table of references in a step E1b then stores it in the database 15 or in a temporary memory (not represented) so as to be able to use it later. In such a case, the table of references may be sent, for example, by the user equipment 20.

The base station 10 then determines, in a step E2, an interval of frequencies from the table of references stored or received so that the power of the signal transmitted by the user equipment 20 at a predetermined off-band frequency is less than a predetermined maximum limit value of power.

In this embodiment, the table of references is used by the base station 10 to carry out the allocation of frequency resources of the user equipment 20. In other words, the base station 10 determines the value of start of frequency block RBstart and the number of sequential blocks L_CRB to allocate to the user equipment 20 as a function of the power attenuation values contained in the table of references. For example, the base station may determine RBstart and L_CRB such that the power reduction MPR value is minimum, for example zero, for the user equipment 20. Obviously, the base station can also take into account other parameters to carry out the allocation of resources such as indications sent by the user equipment on the standard power of its transmitter (Power Headroom (PH) reporting) or estimations of the attenuation linked to the propagation of the signal between the base station and the user equipment.

Once determined, the information of allocation of resources, such as the value of start of frequency block RBstart and the number of frequency blocks L_CRB, are sent, in a step E3, to the user equipment 20.

The user equipment 20 then transmits, in a step E4, signals destined for the base station 10 on the interval of frequencies determined by the values of RBstart and L_CRB received from the base station 20 for the duration of the corresponding time sub-frame.

FIG. 5 illustrates another embodiment of the method according to the invention in which the step of determination E20 is carried out by the user equipment 20 on which is stored, in a memory (not represented), the table of references comprising maximum power reduction values of transmission of a signal by the user equipment 20.

In this embodiment, the user equipment 20 firstly receives, in a step E10, the information of allocation of resources sent by the base station 10. In this embodiment, the base station 10 allocates the resources in the manner known from the prior art. The user equipment 20 receives in particular a value of RBstart and a value of L_CRB allocated in a known manner by the base station 10. The base station may, for example, share out the radio resources in the time and frequency domains between the different user equipments that are connected to it as a function of the information rates that the user equipments have to send to the network, their relative priorities and/or the quality of the reception of the signals transmitted by said user equipments.

The user equipment 20 accesses, in a step E15, the table of references of values of reduction of power of transmission stored in its internal memory (not represented). In a step E20, the user equipment 20 determines, from the table of references, an interval of frequencies to use to transmit its signals, this interval of frequencies being determined so that the power of the signal transmitted by the user equipment 20 at a predetermined off-band frequency is less than a predetermined maximum limit value of power. The interval of frequencies determined by the user equipment 20 lies within the allocated interval of frequencies received from the base station 10, that is to say that it is either a portion of the interval of frequencies allocated by the base station 10, or the whole interval.

The user equipment 20 selects in its table of references the values of RBstart and L_CRB so as to minimise the attenuation of its maximum power of transmission while assuring that the interval of frequencies, determined by the values of RBstart and L_CRB selected, lies within the interval of frequencies allocated by the base station 10. In fact, since the table of references makes it possible to assure that the power of the user equipment 20 does not exceed the required off-band limits, the choice of new values of RBstart and L_CRB in the table of references, lying within the allocated interval of frequencies, makes it possible to maximise the maximum power of transmission while respecting the off-band power limits.

The user equipment 20 then transmits, in a step E40, signals destined for the base station 10 on the interval of frequencies determined for example for the duration of the time sub-frame(s) allocated by the base station 10. The user equipment 20 can modify the interval of frequencies to use in each frame as a function of the optimum combination of RBstart and L_CRB in the table of references for the interval allocated by the base station 10 which can vary from one frame to the other.

Figure 7:
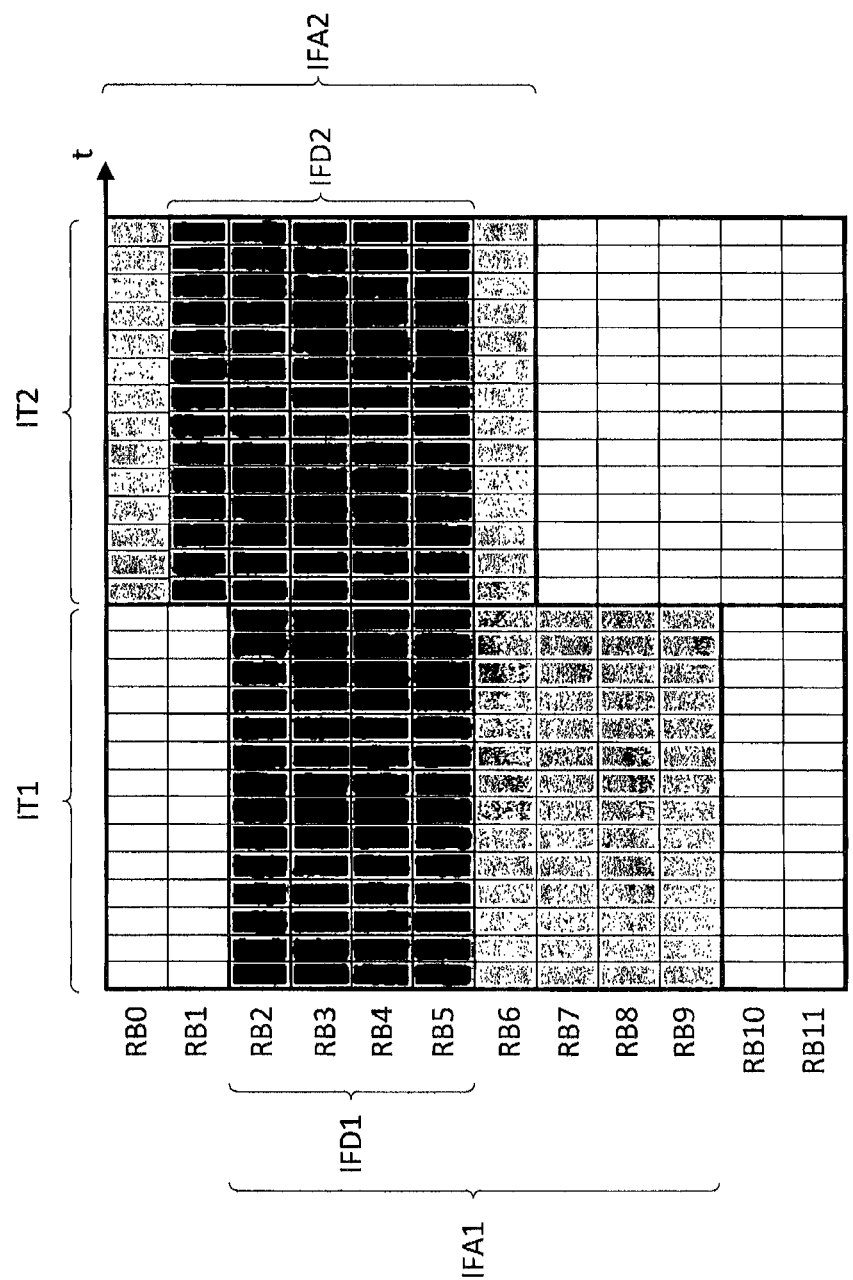
FIG. 7 represents two frames of resources each comprising a time interval determined by the second form of the method according to the invention.

FIG. 7 illustrates two consecutive sub-frames IT1 and IT2 comprising 14 time blocks (during which may be transmitted data such as, for example, OFDM symbols) and 12 frequency blocks extending from RB0 to RB11. In the frame IT1, the base station 10 has allocated to the user equipment 20 the interval of frequencies IFA1 starting at the third frequency block RB2 (RBstart=2) and extending up to the tenth frequency block RB9 included. In the frame IT2, the base station 10 has allocated to the user equipment 20 the interval of frequencies IFA2 starting at the first frequency block RB0 and extending up to the seventh frequency block RB6 included.

In this example, the user equipment 20 has selected, during step E20, in its table of references, the interval of frequencies IFD1 defined by the pair of values (RBstart=2, L_CRB=4) extending from the third frequency block RB2 up to the sixth frequency block RB5 included so as to minimise the attenuation of its power of transmission while assuring that the off-band power of transmission is less than the predetermined limit. In the following frame IT2, the user equipment 20 has selected, during step E20, in its table of references, the interval of frequencies IFD2 defined by the pair of values (RBstart=1, L_CRB=5) extending from the block RB1 to the block RB5 included so as to minimise the attenuation of its power of transmission while assuring that the off-band power of transmission is less than the predetermined limit. In a variant or as a complement, the choice of RBstart and L_CRB in the table of references may be made so as to select L_CRB as large as possible to transmit on an interval of frequencies the widest possible while remaining within the allocated interval of frequencies.

In the second embodiment, the base station 10 may further be configured to determine the interval of frequencies used by the user equipment 20, for example, from signals received from the user equipment 20. For example, in a LTE network, the size of the blocks of resources is defined in a known manner by an index $I_{TBS}$ and a physical resource block number $N_{PRB}$. When the user equipment 20 determines an interval of frequencies to use, it reduces for example the physical resource block number $N_{PRB}$ while retaining the same index $I_{TBS}$—The base station 10 can then determine from signals received from the user equipment 20 the number $N_{PRB}$ and the position of the physical resource blocks used by the user equipment 20 and, for example, decide to allocate to it the size of block of corresponding resources for the remainder so as to free resources for the other user equipments 20. The base station 10 can thus anticipate the behaviour of the user equipments 20: if a user equipment 20 has reduced its bandwidth significantly on a sub-frame, the base station 10 knows that it can allocate fewer resources to this user equipments 20 in the following frames and thereby conserve the bandwidth for other user equipments 20.

FIG. 8 illustrates a set of power curves of transmission of signals of a user equipment 20 destined for a base station 10. In this example, the base station 10 works in reception on the predetermined frequency bands [788, 798] MHz which is divided into 50 frequency blocks (not represented). The off-band power limit $P_{LIM}$ is set at −49 dBm measured in a resolution bandwidth equal to 30 kHz to 799.2 MHz. Hereafter, the power values are measured in a resolution bandwidth equal to 30 kHz.

The curve C1 represents a transmission power curve of a user equipment on the interval of frequencies [792.1; 797.5] MHz, defined by RBstart=20 and L_CRB=30, allocated by the base station according to the prior art and for which no reduction of maximum power has been applied. At 799.2 MHz, the curve C1 lies at around −43 dBm, that is to say above the power limit $P_{LIM}$.

The curve C2 represents a transmission power curve of a user equipment, on the interval of frequencies [792.1; 797.5] MHz defined by RBstart=20 and L_CRB=30, allocated by the base station according to the prior art and for which a reduction of maximum power of 3 dB has been applied. At 799.2 MHz, the curve C2 lies at around −46 dBm, that is to say above the power limit $P_{LIM}$.

The curve C3 represent a transmission power curve of a user equipment, on the allocated interval of frequencies [792.1; 797.5] MHz defined by RBstart=20 and L_CRB=30, allocated by the base station according to the prior art and for which a reduction of maximum power of 6 dB has been applied. At 799.2 MHz, the curve C3 lies around −53 dBm, that is to say below the power limit $P_{LIM}$, at 799.2 MHz but the power of transmission of the signal has been reduced by 6 dB, that is to say divided by around 4.

The curve C4 represents a transmission power curve of a user equipment 20 for which no reduction of maximum power has been applied. In this example, the base station has selected, in the step E2 according to the first embodiment or the user equipment 20 has selected, in the step E20 according to the second embodiment, from the table of references, the same value of start of interval as for the three preceding curves (RBstart=20) but a width of interval of frequencies to use reduced by half (L_CRB=15) which guarantees a transmission at a maximum power not attenuated of the user equipment 20 equal to that of the curve C1 (the curve C4 representing the power measured in a resolution bandwidth of 30 kHz thus lies 3 dB above the curve C1 in the frequency interval corresponding to the allocation reduced by half in the frequency domain). The curve C4 lies at around −53 dBm, that is to say below the power limit $P_{LIM}$, at 799.2 MHz for a transmission at maximum power not attenuated on the interval of frequencies defined by (RBstart=20, L_CRB=15). The reduction of the width of the interval determined from values of the table of references thus makes it possible to assure that the off-band power of transmission is less than the limit value while here avoiding attenuating the power on the useful determined interval of frequencies of transmission.

Thus, in the first embodiment, the base station 10 determines the allocations of resource for the user equipment 20 from an associated table of references stored or received by the base station 10. In this first embodiment, the table of references is used to allocate the resources. In the preceding example, in the absence of a table of references, the base station has allocated the allocation of frequencies [792.1; 797.5] MHz (curves C1 to C3). In order to respect the off-band power of transmission, the user equipment would have been constrained to reduce by a factor of around 4 (6 dB) its power of transmission (curve C3). From the table of references, the base station has been able to determine an allocation of frequency reduced by half [792.1; 794.8] MHz (curve C4) such that the user equipment is not constrained to reduce its power of transmission in order to respect the off-band power of transmission. The allocation of frequencies defined from the table of references is thus advantageous compared to the allocation of the prior art without the table of references.

In the second embodiment, the user equipment 20 receives in a known manner an information of allocation of an interval of frequencies and determines itself from the table of references a frequency interval, in the allocated interval of frequencies, allowing it to transmit signals while assuring that the power thereof is less than the predefined off-band limit. In this second mode, the table of references is used to define, in the allocated interval of frequencies, the useful interval of frequencies enabling a transmission with an attenuation of minimum power while guaranteeing an off-band power less than the required limit at the predefined frequency (curve C4).

The invention claimed is:

1. A method for transmitting, by a user equipment, a signal to a base station in a telecommunication network, said method comprising:
   determining an interval of frequencies of transmission of the signal to be sent to the base station, said interval of frequencies lying in a predetermined frequency band on which the base station operates, said interval of frequencies based on a table of references comprising values of reduction of maximum power of transmission of a signal by the user equipment such that a power of the signal transmitted by the user equipment at a predefined off-band frequency is less than a predetermined maximum limit value of power, said interval of frequencies enabling a transmission with a minimum attenuation of power,
   wherein the determining is performed by the user equipment, and
   transmitting said signal by the user equipment to said base station in said interval of frequencies.

2. The method according to claim 1, wherein the table of references indicates a value of reduction of power of transmission of a signal as a function of a start value of an interval of frequencies and of a value of a width of said interval of frequencies from said start of interval value.

3. The method according to claim 2, wherein the determination comprises selecting in the table of references the start and the width of the interval of frequencies of transmission of the signal by the user equipment such that the power of transmission of the signal by the user equipment is maximum.

4. A telecommunication system for determining an interval of frequencies of transmission, by a user equipment, of a signal to be sent to a base station in a telecommunications network, said system comprising:
   at least one base station configured to operate on a predetermined frequency band and
   at least one user equipment comprising
      a memory for storing a table of references comprising values of reduction of maximum power of transmission of a signal by the user equipment such that a power of the signal transmitted by the user equipment at a predetermined off-band frequency is less than a predetermined maximum limit value of power, the user equipment configured to determine the interval of frequencies from the table of references, and
      a transmitter configured to transmit signals on said frequency band, said interval of frequencies lying in said predetermined frequency band,
      said interval of frequencies enabling a transmission with a minimum attenuation of power.

5. A user equipment for determining an interval of frequencies of transmission, by said user equipment, of a signal to be sent to a base station in a telecommunications network, said interval of frequencies lying in a predetermined frequency band on which said base station operates and on which the user equipment is configured to transmit signals, the user equipment comprising:
   a memory for storing a table of references comprising values of reduction of maximum power of transmission of a signal by the user equipment such that a power of the signal transmitted by the user equipment at a predetermined off-band frequency is less than a predetermined maximum limit value of power, the user equipment being configured to determine the interval of frequencies from the table of references, said interval of frequencies enabling a transmission with a minimum attenuation of power, and
   a transmitter configured to transmit the signal in the interval of frequencies.

6. A non-transitory computer readable medium comprising instructions for the implementation, by a user equipment, of the steps of the method according to claim 1.

7. A method for transmitting, by a user equipment, a signal to a base station in a telecommunication network, said method comprising:
   determining an interval of frequencies of transmission of the signal to be sent to the base station, said interval of frequencies lying in a predetermined frequency band on which the base station operates, said interval of frequencies based on a table of references comprising values of reduction of maximum power of transmission of a signal by the user equipment such that a power of the signal transmitted by the user equipment at a predefined off-band frequency is less than a predetermined maximum limit value of power, said interval of frequencies enabling transmission without attenuating a power of a signal transmitted at said interval, wherein the determining is performed by the user equipment, and transmitting said signal by the user equipment to said base station in said interval of frequencies.

* * * * *